United States Patent
Ahn

(10) Patent No.: US 7,366,156 B2
(45) Date of Patent: Apr. 29, 2008

(54) CONTEXT SYNCHRONIZATION METHOD IN MOBILE COMMUNICATION SYSTEM

(75) Inventor: Kye-Hyuk Ahn, Gyeonggi-Do (KR)

(73) Assignee: LG Electroncis Inc., Seoul (KR)

( * ) Notice: Subject to any disclaimer, the term of this patent is extended or adjusted under 35 U.S.C. 154(b) by 608 days.

(21) Appl. No.: 10/780,866

(22) Filed: Feb. 19, 2004

(65) Prior Publication Data

US 2004/0165577 A1 Aug. 26, 2004

(30) Foreign Application Priority Data

Feb. 20, 2003 (KR) ........................ 10-2003-0010735

(51) Int. Cl.
*H04Q 7/24* (2006.01)
(52) U.S. Cl. ........................... 370/350; 370/353
(58) Field of Classification Search .................... None
See application file for complete search history.

(56) References Cited

U.S. PATENT DOCUMENTS

| | | | | |
|---|---|---|---|---|
| 6,233,458 | B1 * | 5/2001 | Haumont et al. | 455/445 |
| 6,463,055 | B1 * | 10/2002 | Lupien et al. | 370/353 |
| 6,731,932 | B1 * | 5/2004 | Rune et al. | 455/432.1 |
| 2002/0131395 | A1 | 9/2002 | Wang | 370/349 |
| 2004/0139235 | A1 * | 7/2004 | Rashid et al. | 709/248 |
| 2004/0230661 | A1 * | 11/2004 | Rashid et al. | 709/207 |
| 2004/0246984 | A1 * | 12/2004 | Hundscheidt et al. | 370/432 |
| 2005/0037755 | A1 * | 2/2005 | Hind et al. | 455/435.3 |

FOREIGN PATENT DOCUMENTS

EP 9859468 A2 12/1998

* cited by examiner

*Primary Examiner*—Erika A. Gary
(74) *Attorney, Agent, or Firm*—Ked & Associates, LLP

(57) ABSTRACT

Disclosed is a context synchronization method in a mobile communication system dealing with a packet transmission/reception. If two peers of a protocol have the same information and their data are not frequently updated, the invention makes the QUERY about the STATUS or CONTEXT of the relative side to acquire the previous information of the relative side, thereby enabling to cope with the situation more flexibly. In a protocol of a radio system having a client and a server communicating with each other, the invention includes the steps of performing idle and normal procedures in the client, performing a recovery procedure if an error occurs in performing the idle and normal procedures, and performing a re-attach procedure and an activation procedure according to the error and an error occurring point. Also, the invention includes the steps of having a mobile station (MS) to select a cell fitting for a corresponding network to register the mobile station to the network, performing general idle and normal procedures, and performing a recovery procedure if a failure occurs.

30 Claims, 3 Drawing Sheets

CONTEXT SYNCHRONIZATION METHOD IN MOBILE COMMUNICATION SYSTEM

BACKGROUND OF THE INVENTION

1. Field of the Invention

The invention generally relates to communication systems, and more particularly to a context synchronization method performed in a mobile communication system which manages packet transmission/reception.

2. Background of the Related Art

Generally, in radio protocols of systems which perform packet-centered burst data communication such as General Packet Radio Services (GPRS), in radio protocols of a mobile communication system which have the same peer information and are not frequently updated such as a session management protocol (SM) and a mobility management protocol (MM), context synchronization of each protocol is always performed based on a client/server relationship. In general, a mobile station (MS) functions as a client while a network functions as a server. If information possessed by the client is different from that of the server when the client makes a request, the server rejects the request of the client. In such a case, a corresponding protocol layer is considered to be in an abnormal state and thus does not operate smoothly. The MS, for example, the client, should restart the synchronization procedure from the beginning.

FIGS. 1(a) and 1(b) are flowcharts of a related-art processing method of a radio protocol between a network and a MS. Referring to FIG. 1, once power of a terminal is turned on, cell selection is executed, S1. It is then judged whether a cell is selected, S2. If a cell is not selected, a search for other available cells starts, S16. If other available cells exist, the process returns to the cell selection step. If no other cells are available, service is limited and another search is performed to find other available cells, and this process is periodically repeated until an available cell is found.

If a cell is selected, the MS performs a LUP (location update procedure) or RAU (routing area update) procedure to register itself to a network, S3, and judges whether there is a problem in GMM (GPRS MM) or not, S4. If a problem exists in the GMM, the process returns to the cell selection step. If no problem exist in the GMM, a general idle and normal procedures are executed, S5. One of the following procedures are then performed: case (A)—a GMM failure occurrence in the respective MS and network, a case (B)—a PDP failure occurrence in network, and a case (C)—a PDP failure occurrence in MS. These cases are generated due to differences in CONTEXT from each other in synchronization between the network and MS.

A CONTEXT is environmental information. In other words, the CONTEXT covers information that is a part of an operating environment of an application and it can be sensed by the application. The CONTEXT typically includes the location, identity, activity and state of people, groups and objects. The application may sense its software and hardware environments to detect, for example, the capability of peripheral resources by receiving the CONTEXT In case (B), if a PDP failure occurs in network, S6, a self-termination is executed to perform self-deactivation, S7. Then, the process waits until the terminal sends a SM or a GMM message to the network, S8. Thereafter, it judges whether the SM message is received, S9. If the SM message is not received, the process returns to the previous standby status. If the SM message is received, the SM status message confirming the reception is transferred, S10.

Then, self-deactivation of the PDP is performed, S11. Thereafter, the idle and normal procedures are performed, S12, and a user requests a PDP CONTEXT first, S13. Then, a PDP activation procedure is executed. In this procedure, first, PDP activation is requested, S14, and the PDP activation is then accepted to achieve the synchronization, S15. If the GMM becomes good again after completion of the above steps, the process returns to step S5, to perform the idle and normal procedures for normal operation.

In case (C), if PDP failure occurs in the MS, S20, a deactivation procedure to delete the previous unsynchronized CONTEXT is performed, S21. Then, the process returns to step S12, to perform the idle and normal procedures in case (B). Remaining steps S12 through S15 in case (B) are executed precisely.

In case (A), if a GMM failure occurs in the MS or in the network, S30, it is judged whether a current PDP session exists, S31. If a current PDP session exists, a self-termination procedure is performed, S32. Thereafter, the GMM is checked to determine if it is the cause, S33, and a GMM RE-ATTACH procedure is executed. On the other hand, if the PDP session does not exist in the previous S31, the RE-ATTACH procedure is directly executed.

The GMM RE-ATTACH procedure first judges whether the failure occurs in the network or MS, S34. If the failure occurs in the network, 'paging with IMSI' or a 'DETACH request' is executed, S35. Subsequently, an ATTACH procedure is performed, S36, and the process goes to the next step. If the failure occurs in the MS in S34, the ATTACH procedure is directly performed and the process goes to the next step, S37. It is then judged whether the ATTACH procedure is successfully performed or not, S38.

If the ATTACH procedure is successfully performed, the process goes to the step S12, to perform the idle and normal procedures in case (B). Similar to case (C), the steps S12 through S15 of case (B) are then executed. If the ATTACH procedure is not performed successfully, the process goes back to S1, turning on power to select the cell.

Thus, if the CONTEXTs possessed by the MS and the network are different from each other, the related-art method has the generation/modification/termination protocols only. As a result, an abnormal state may occur according to various situations of the radio network. In an abnormal state, the network and MS are unable to be informed of the information of the relative side, and therefore may fail to efficiently cope with the following operation. Hence, power should be unconditionally turned on again or the initialization state should be retrieved so that the procedures previously been executed with the network are repeated.

Accordingly, as the error occurs in the CONTEXTs between the network and MS, nothing can be occasionally done by the MS according to the implementation status of the network. Moreover, all the procedures of the channels between the network and MS may be re-executed from the beginning, thereby wasting radio resources as well as introducing other inefficiencies.

SUMMARY OF THE INVENTION

An object of the invention is to solve at least one of the above problems and/or disadvantages and to provide one or more of the advantages described hereinafter.

Another object of the present invention is to provide a context synchronization method in a mobile communication system that substantially obviates one or more problems of the related-art method.

Another object of the invention is to provide a context synchronization method in a mobile communication system, by which sessions are efficiently managed.

To achieve these objects and other advantages of the invention, as embodied and broadly described herein, in a protocol of a radio system having a client and a server communicating with each other, a context synchronization method according to one embodiment of the present invention includes performing idle and normal procedures in the client, performing a recovery procedure if an error occurs in performing the idle and normal procedures, and performing a re-attach procedure and an activation procedure according to the error and an error occurring point. Preferably, the client is a mobile station (MS) and the server is a network.

In accordance with another embodiment of the present invention, a context synchronization method in a mobile communication system includes having a mobile station (MS) select a cell which fits a corresponding network in order to register the mobile station to the network, performing general idle and normal procedures, having the network send a packet paging to the MS if a failure occurs, having the MS transmit context information to the network, and performing a GMM or a SM recovery procedure.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1A:
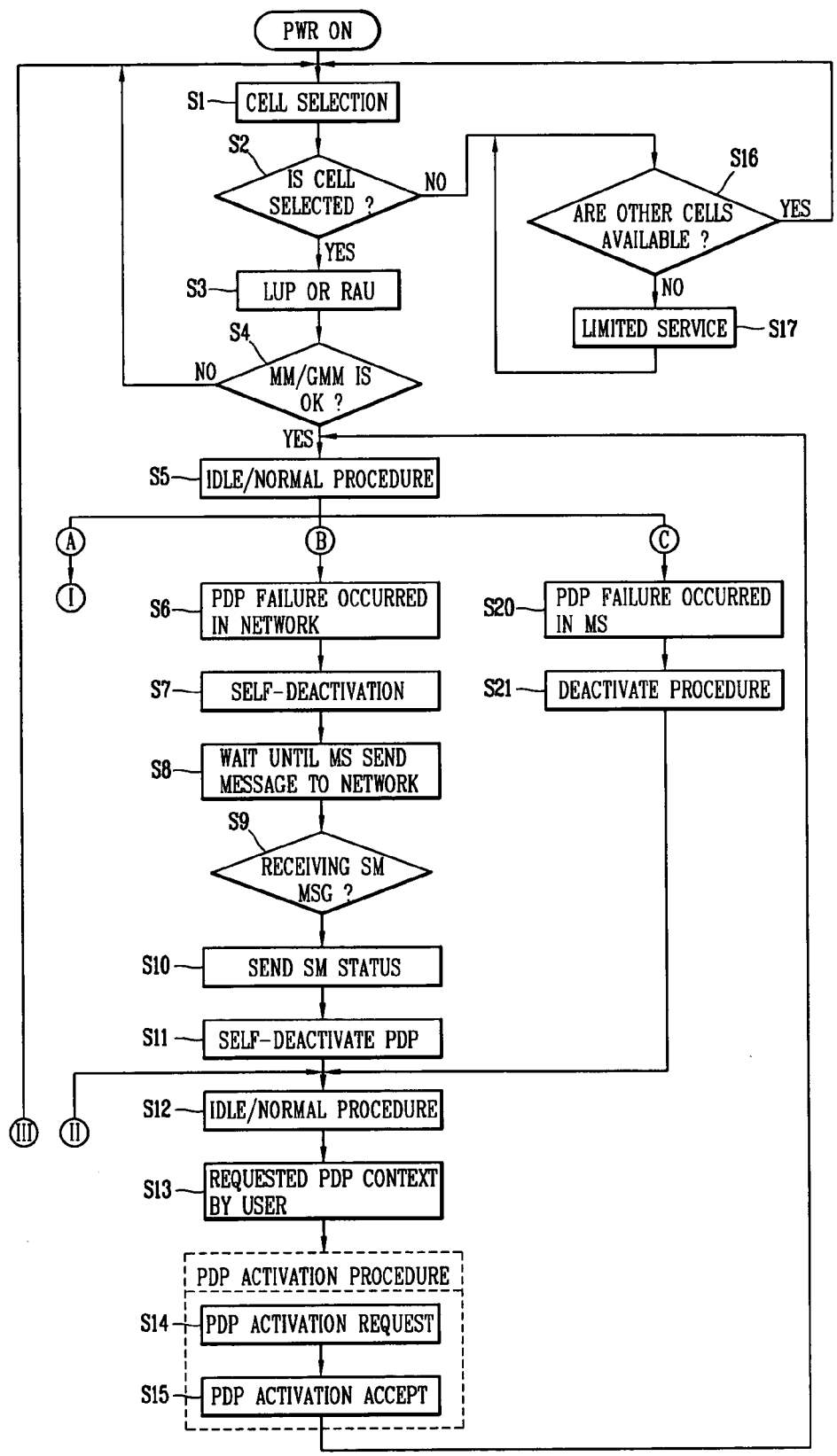
FIG. 1(*a*) is a flowchart showing steps of a processing method of a radio protocol between a network and MS according to a related-art, and FIG. 1(*b*) includes additional steps in this method.

In case a protocol is enabled to operate only in a state where data of two peers as contexts are synchronized, there exists a server/client relationship. In such a case, an MS serving as a client makes a request and a node of a network such as MSC, VLR, SGSN, GGSN, or others operates as a server. Because there may always exist a procedure that the client requests a prescribed resource or an authentication to the server for approval, at least one embodiment of the present invention includes a step where the MS performs a query procedure to acquire its status stored in the network to cope flexibly with its abnormal situations.

Moreover, when a failure occurs in the network, a method of using an effective QUERY to the MS is used to restore data of the network. This Query procedure is a function and/or processing which performs transmitting a Query type context, and performs an optimal processing according to the response of the Query type CONTEXT. In such a case, the HLR, serving as a basic database of the network, preferably contains all information modified by the MS until the modified information is erased by operations (e.g., 'DEACTIVATE' or 'DETACH') of the MS. When a service is resumed by initial power-on, all information except the previous basic information may be initialized since trouble may occur in case of a GMM.

For instance, when a SM (session management) executes a corresponding procedure to connect, terminate, or modify a prescribed session, if the network suddenly fails to normally perform a normal procedure including a 'REJECT' for all operations, the MS makes a 'QUERY' of its information to the network to acquire information of a PEER protocol and proceeds to a corresponding operation.

In case of sending an ACTIVATION message to the network from the MS and receiving 'REJECT', the MS sends a QUERY type, 'CONTEXT—INFORMATION' message to the network. The Query type CONTEXT means a CONTEXT which transmits information of a transmission side and requests the response to a reception side. If the network sends a corresponding response, the MS operates according to the response. If there is a CONTEXT appropriate for an item demanded by the MS, the MS sets its protocol to the value of the CONTEXT as it is. If it is impossible to reuse the value as it is, the MS modifies a portion of the impossible value by a MODIFICATION procedure. On the other hand, if the modified value is of no use, for example, an APN to be used in GPRS is different, the CONTEXT is deleted from the network by a DEACTIVATION procedure.

In case of the MM, if a network sends a REJECT message to a MS intending to make a registration to the network, the MS makes a QUERY to the network according to a CAUSE of the REJECT. Also, the MS is enabled to operate more flexibly using contents of the QUERY. In doing so, the MS makes the QUERY to a HLR using a parameter uniquely assigned to a terminal, such as an IMSI, according to the CAUSE and then operates based on the acquired information. During an update procedure, if the network sends an abnormal response when the MS enters a new area, the MS makes the QUERY the most basic IMSI of its MM CONTEXT of the HLR using the previous information.

To prepare itself for such a case, the HLR receives a DETACH REQUEST message from the MS. In case that it is first started from the network and the terminal receives a corresponding response, it is unlikely the GMM information, which is possessed by the HLR, for the MS is erased. Hence, except in such a case, the network should respond to the QUERY whenever the MS makes the request via IMSI.

Figure 2:
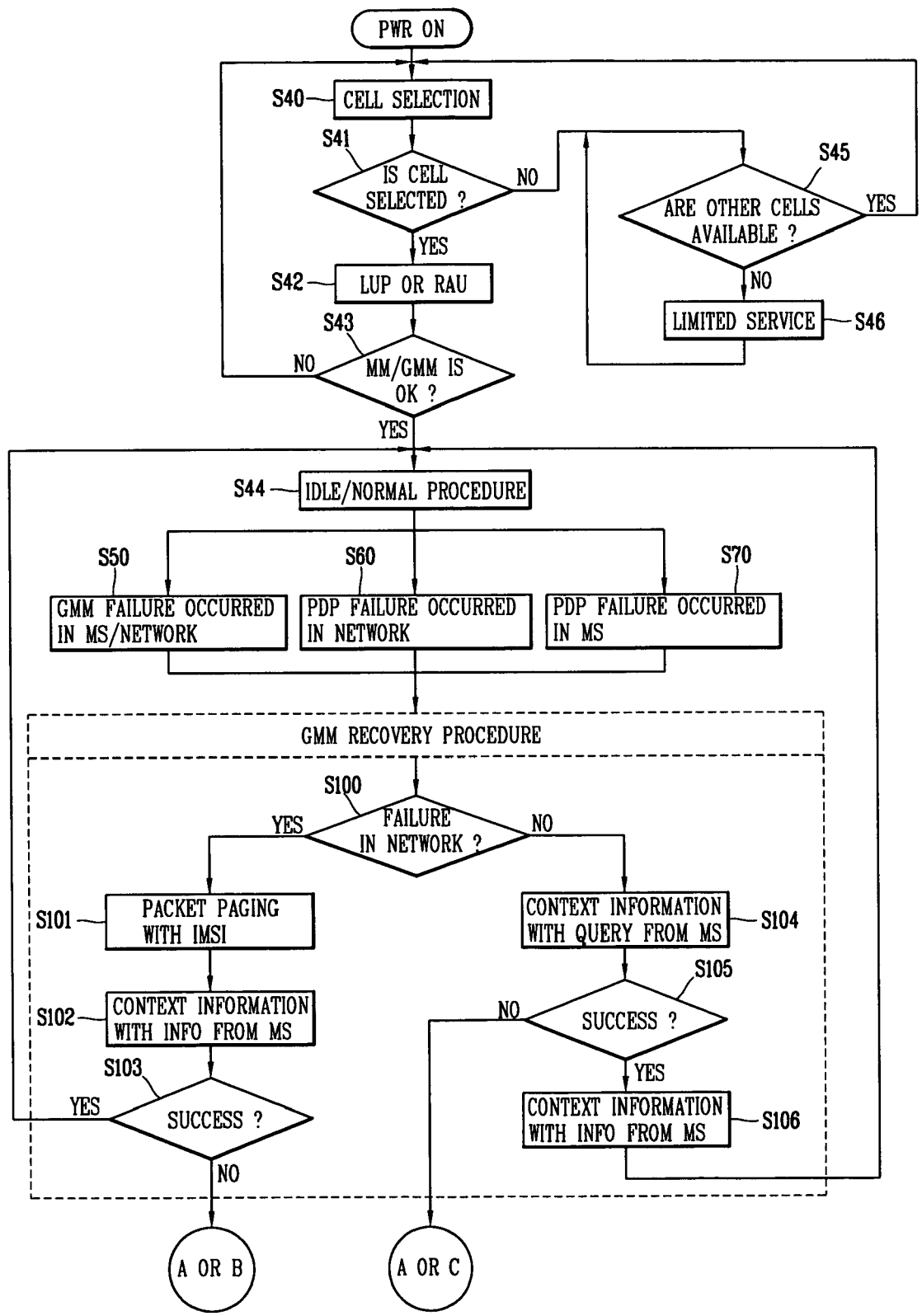
FIG. 2 is a flowchart of a context synchronization method in a mobile communication system according to the invention.

FIG. 2 is a flowchart of a context synchronization method performed in a mobile communication system according to the invention. In this method, once power of a terminal is turned on, the terminal starts to scan a corresponding cell, S40. It is checked whether a cell is selected, S41. If the cell is not selected, it is checked whether other cells are available, S45. If there exists an available cell, the process goes back to step S40 to re-execute the procedure. If there are no other cells available, a limitation is put on a service and other cells are searched again. These steps are periodically repeated until other available cells are found.

If a cell is selected, an LPU or RAU procedure is performed to register the terminal in the network, S42. It is then judged whether a state of GMM is good, S43. If the state of GMM is not good, the process is restarted from step S40. If the state of GMM is good, general idle and normal procedures are performed, S44.

Thereafter, processes are performed in at least one of the following three cases: case of GMM failure occurrence in the MS or network, a case of PDP failure occurrence in the network, and a case of PDP failure occurrence in MS. Execution of a GMM RECOVERY procedure in accordance with the present invention is applicable to each of these cases.

Figure 1B:
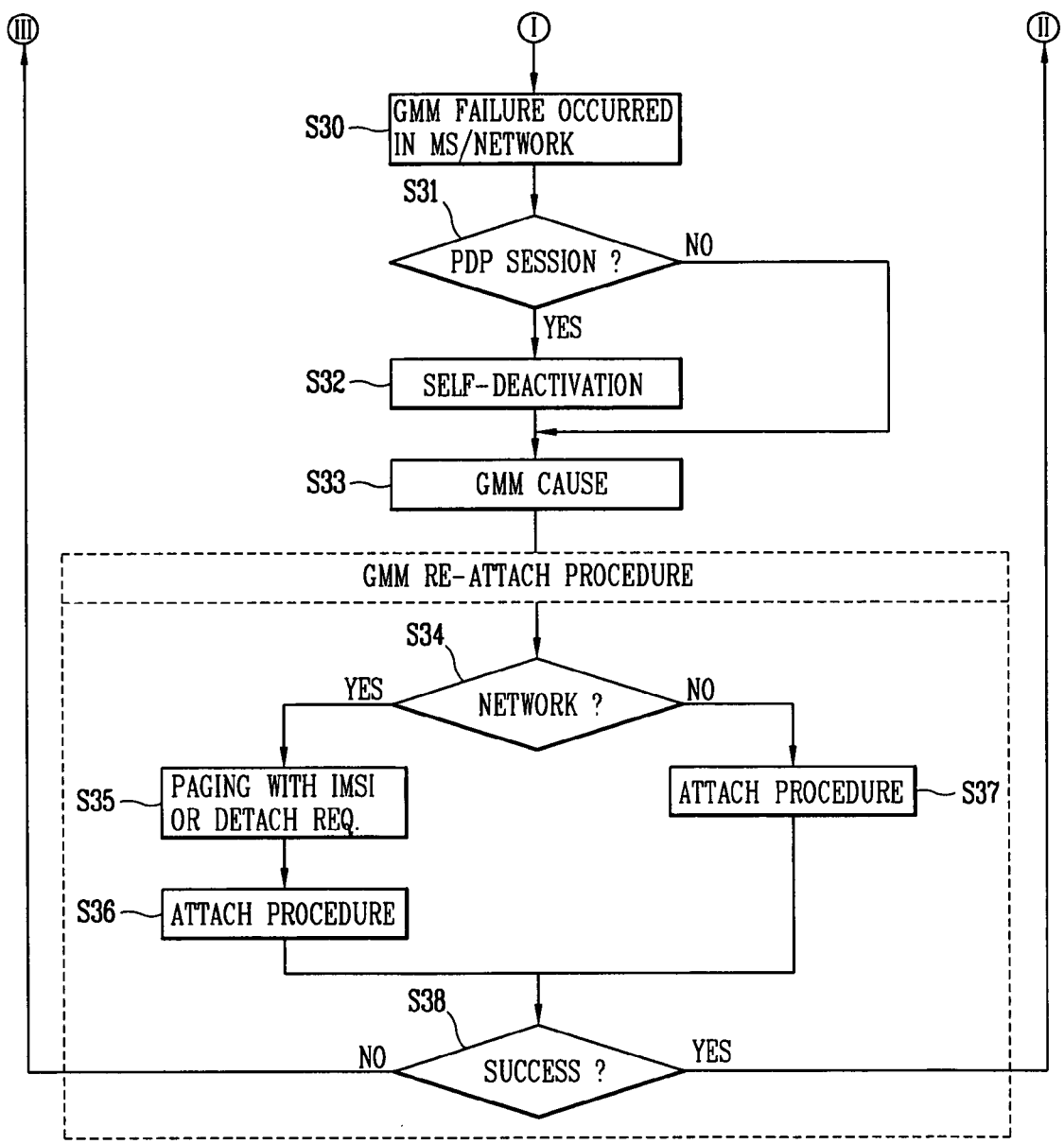

In the GMM RECOVERY procedure, it is judged whether a failure has occured in a network or a terminal, S100. If a failure has occurred in the network, packets are paged to an IMSI, S101, and the MS transmits its CONTEXT information of INFO type to the network, S102. INFO-type CONTEXT means a CONTEXT that transmits information of the transmission side without requesting a corresponding response. It is then checked whether the transmission is successful, S103. If the transmission is successful, the process goes back to the step S44 to perform a normal operation. However, if the transmission fails, the process may go to the steps of case (A) or case (B) in FIGS. 1(a) and 1(b) to perform corresponding steps S30~S38 or S6~S15 until a 'PDP_CONTEXT_ACTIVATION_ACCEPT' message is finally received for synchronization.

Meanwhile, if a failure has occurred in the MS, the MS transmits its CONTEXT information of QUERY type to the network, S104. It is then checked whether the transmission is successful, S105. If the transmission is successful, the INFO type information is transmitted to the MS from the network, S106, to achieve the synchronization. The process then goes back to step S44 to perform a normal operation. Yet, if the transmission fails, the process may go to the steps in case (A) or (C) in FIG. 1(a) or 1(b) to perform the steps S30~S38 or S20~S21 until the synchronization is achieved.

The present invention is also a computer-readable medium staring a program for performing all or a portion of the steps of the method described herein. The medium may be stored (e.g., in the form of a ROM chip or other memory) in the client, in the server, or multiple mediums may exist for storing programs for implementing the method in both the client, server, or in the intermediate processing client such as but not limited to a base station, switching system, a manager, a controller.

As explained in the foregoing description, in case that two peers of a protocol have the same information and their data are not frequently updated, related-art methods unconditionally turn power on again or returns to an initialization state to repeat procedures previously executed in order to achieve synchronization. However, the context synchronization method according to the present invention makes a QUERY about the STATUS or CONTEXT of the relative side to acquire the previous information of the relative side, thereby enabling to cope with the situation more flexibly. Moreover, the invention performs the synchronization using the previous information to reduce the radio resource waste caused by deleting the CONTEXT to restart until the synchronization is achieved.

The forgoing embodiments are merely exemplary and are not to be construed as limiting the invention. The teachings can be readily applied to other types of apparatuses as well as a peer protocol in a mobile communication system dealing with packet communication. The description of the invention is intended to be illustrative, and not to limit the scope of the claims. Many alternatives, modifications, and variations will be apparent to those skilled in the art.

What is claimed is:

1. A context synchronization method performed in a radio system having a client and server communicating with each other, comprising:

performing idle and normal procedures in the client;

performing a recovery procedure if an error occurs in performing the idle and normal procedures, the error occurring when the client and server have different context information; and performing a re-attach procedure and an activation procedure according to the error and an error occurring point, wherein performing said recovery procedure includes:

transmitting context information managed by the server to the client when the error occurs in the client, to achieve synchronization between the client and server as a result of the client and server having same context information, and transmitting context information managed by the client to the server when the error occurs in the server, to achieve synchronization between the server and client as a result of the server and client having same context information, wherein transmitting the context information to the client or server occurs without performing a power down operation or returning to an initialization state, wherein if the failure occurs in the network, the network receives the context information of the MS by sending a packet paging with an international mobility subscriber identity (IMSI) to the MS so that the received context information of the MS is used as context information of the network, and wherein the context information of the MS received by the network includes INFO-type context information.

2. The synchronization method of claim 1, wherein the client is a mobile station (MS) and the server is a network.

3. The synchronization method of claim 2, wherein the error occurring point is at the MS or the network.

4. The synchronization method of claim 1, wherein the radio system is a general packet radio service (GPRS) system which deals with a packet communication.

5. The synchronization method of claim 1, wherein the radio system operates based on a protocol which includes peers having same information which is updated at predetermined time periods.

6. The synchronization method of claim 5, wherein the protocol includes a GPRS mobility management (GMM) protocol or a session management (SM) protocol.

7. The synchronization method of claim 1, wherein the error is a GMM failure.

8. The synchronization method of claim 1, wherein the error is a packet data protocol (PDP) failure.

9. A context synchronization method performed in a radio system having a client and server communicating with each other, comprising:

performing idle and normal procedures in the client;

performing a recovery procedure if an error occurs in performing the idle and normal procedures, the error occurring when the client and server have different context information; and performing a re-attach procedure and an activation procedure according to the error and an error occurring point, wherein performing said recovery procedure includes:

transmitting context information managed by the server to the client when the error occurs in the client, to achieve synchronization between the client and server as a result of the client and server having same context information, and transmitting context information managed by the client to the server when the error occurs in the server, to achieve synchronization between the server and client as a result of the server and client having same context information, wherein transmitting the context information to the client or server occurs without performing a power down operation or returning to an initialization state, wherein if the error occurs in the MS, the MS performs a query procedure and transfers INFO-type context information to the network.

10. The synchronization method of claim 9, wherein, in the query procedure, the MS transfers a query type context information to the network and receives a response from the network.

11. The synchronization method of claim 10, wherein the response is a status information of a previous packet data protocol (PDP).

12. A context synchronization method in a mobile communication system comprising:
selecting a cell in a network by a mobile station;
registering the mobile station in the network;
performing general idle and normal procedures; and
performing a recovery procedure if a failure occurs, wherein performing said recovery procedure includes:
transmitting context information managed by the mobile station to the network when the failure occurs in the network, to achieve synchronization between the mobile station and network as a result of the mobile station and network having same context information, and
transmitting context information managed by the network to the mobile station when the failure occurs in the mobile station, to achieve synchronization between the network and mobile station as a result of the network and mobile station having same context information, wherein transmitting the context information to the network or mobile station occurs without performing a power down operation or returning to an initialization state, wherein INFO-type context information is transmitted to the network if the failure occurs in the network.

13. The synchronization method of claim 12, wherein the mobile communication system is a packet communication system which includes a general packet radio service (GPRS) system.

14. The synchronization method of claim 12, wherein the mobile station functions as a client and the network functions as a server.

15. The synchronization method of claim 12, wherein the mobile station registers itself to the network through location update (LUP) or routing area update (RAU).

16. The synchronization method of claim 12, wherein the failure is GMM failure or packet data protocol (PDP) failure.

17. The synchronization method of claim 12, wherein if the failure occurs in the network, having the network send a packet paging with an international mobility subscriber identity (IMSI) to the mobile station before the mobile station transmits the context information.

18. A context synchronization method in a mobile communication system comprising:
selecting a cell in a network by a mobile station;
registering the mobile station in the network;
performing general idle and normal procedures; and
performing a recovery procedure if a failure occurs, wherein performing said recovery procedure includes:
transmitting context information managed by the mobile station to the network when the failure occurs in the network, to achieve synchronization between the mobile station and network as a result of the mobile station and network having same context information, and
transmitting context information managed by the network to the mobile station when the failure occurs in the mobile station, the achieve synchronization between the network and mobile station as a result of the network and mobile station having same context information, wherein transmitting the context information to the network or mobile station occurs without performing a power down operation or returning to an initialization state,
wherein if the failure occurs in the mobile station:
transmitting query-type context information to the network; and
transmitting INFO-type information to the mobile station from the network in response to the query.

19. A context synchronization method, comprising:
detecting a failure in a client; and
transmitting information managed by a server to the client to resynchronize the client with the server as a result of the client and server having same information, wherein the client is resynchronized to the server based on said same information without performing a power down operation or returning to an initialization state, said method further comprising:
transmitting a query from the client to the server;
transmitting INFO-type context message from the client to the server,
wherein the client receives said information from the server in response to the query and INFO-type context message.

20. The method of claim 19, wherein the failure includes a GPRS mobility management (GMM) error.

21. The method of claim 19, wherein the failure includes a packet data protocol (PDP) error.

22. The method of claim 19, wherein said information is one of status information or context information stored in the server.

23. The method of claim 19, wherein said information include status information of a previous packet data protocol (PDP).

24. The method of claim 19, wherein the client is a mobile station and the server is a network in a mobile communication system.

25. The method of claim 24, wherein the mobile communication system operates according to a general packet radio service (GPRS) protocol.

26. A context synchronization method, comprising:
detecting a failure in a server; and
transmitting information managed by a client to the server to resynchronize the server with the client as a result of the server and client having same information, wherein the server is resynchronized to the client based on said same information without performing a power down operation or returning to an initialization state, said method further comprising:
transmitting a packet paging with an international mobility subscriber identity (IMSI) from the server to the client, said information including an INFO-type context message transmitted from the client to the server in response to the packet paging.

27. The method of claim 26, wherein the failure includes a GPRS mobility management (GMM) error.

28. The method of claim 26, wherein the failure includes a packet data protocol (PDP) error.

29. The method of claim 26, wherein the information is one of status information or context information stored in the server.

30. The method of claim 26, wherein the client is a mobile station and the server is a network in a mobile communication system.

* * * * *